(No Model.)
E. O. POHL.
DAMPER REGULATOR, INDICATOR, AND LOCK.
No. 281,726. Patented July 24, 1883.
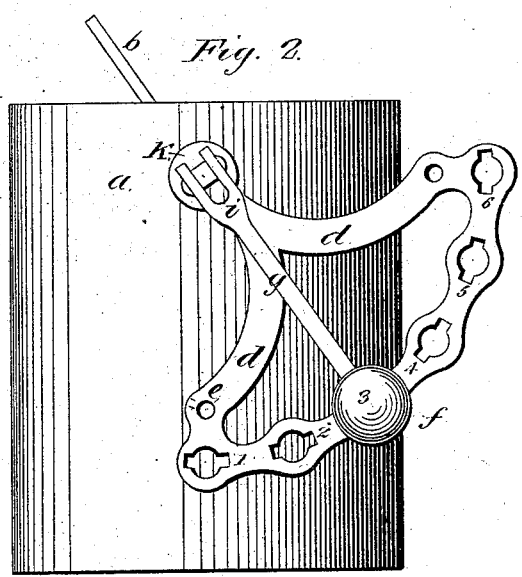
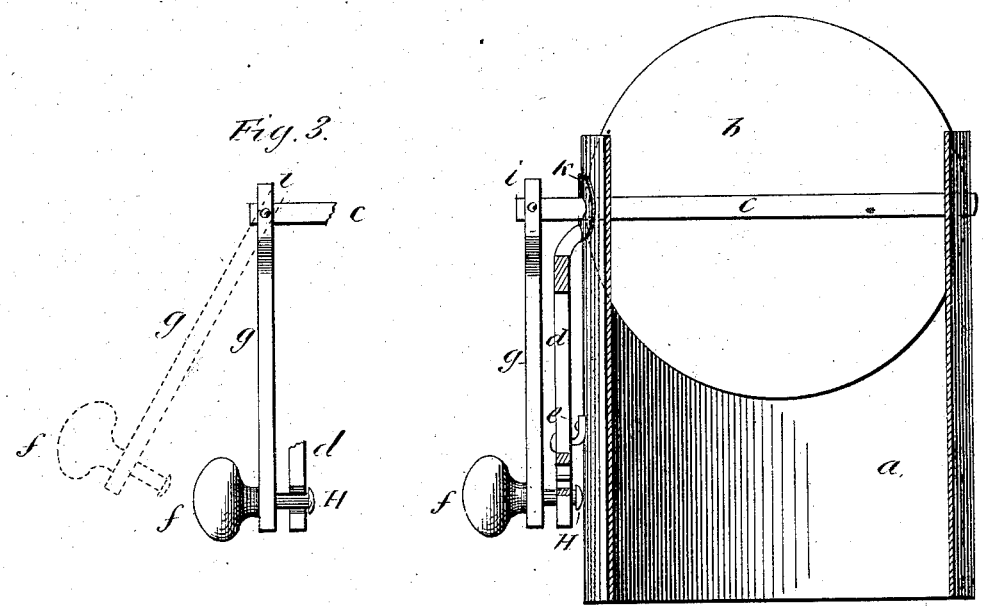
Witnesses.
John Welsh
Jno. E. Pohl
Inventor.
E. Otto Pohl

UNITED STATES PATENT OFFICE.

E. OTTO POHL, OF PHILADELPHIA, PENNSYLVANIA.

DAMPER REGULATOR, INDICATOR, AND LOCK.

SPECIFICATION forming part of Letters Patent No. 281,726, dated July 24, 1883.

Application filed March 16, 1883. (No model.)

*To all whom it may concern:*

Be it known that I, E. OTTO POHL, a citizen of the United States, residing at Philadelphia, in the county of Philadelphia and State of Pennsylvania, have invented a new and useful Damper Regulator and Lock, of which the following is a specification.

My invention relates to an improvement in operating dampers used for regulating drafts or currents; and the object of my improvements are, first, to provide a sure and positive position; and, second, to produce a lock for that position, so that any jar or shaking may not dislodge the position accepted. I attain these objects by the mechanism illustrated in the accompanying drawings, in which—

Figure 1 is a vertical section of the entire machine; Fig. 2, a side view, showing the manner of locking; Fig. 3, a detailed view of the lever and key attached to a damper rod or pivot.

Similar letters refer to similar parts throughout the several views.

*a*, Fig. 2, is a section of a stove-pipe with a damper, *b*, as in general use.

*d*, Figs. 1 and 2, is a quadrant with a number of divisions, 1 to 6, or openings, with notches running parallel with the curved side of the same, having its center K. At the damper-rod *c*, Fig. 2, it is fastened to the pipe *a* by a short arm, *e*, with a bolt or rivet making this quadrant stationary.

*g*, Figs. 1, 2, 3, is an arm or lever hinged to the damper-rod *c* in front of the quadrant *d*. The opposite end of this arm or lever *g*, which corresponds in length with the distance from the center of damper-rod to the center of notches 1 6, has a pin, H, with a shoulder of corresponding size with the openings 1 6 of the quadrant. *f* is a knob or handle.

In the accompanying drawings, Fig. 1, the position of the damper is partly open; therefore the pin H of lever *g* is placed in opening 3.

The operation is as follows: If the damper *b* shall be entirely closed—that is, to stand horizontal—the pin H is lifted out of notch 3 by taking hold the knob *f*, and H drawn out of the opening, which motion is enabled by the lever being hinged at *i*, Fig. 3, and placed in opening 6 and pin H dropped in the notch. Damper *b* must follow arm *g* on account of its connection, the gravity holding the lever in its place, and the shoulder of H, preventing the same from slipping outward, a lock is formed. By continuous operation the damper can be placed in as many positions and locked as there are openings in the quadrant's radius.

What I claim as my invention, and desire to secure by Letters Patent, is—

In a damper, the combination of an inclined quadrant having the notched openings, and a lever, *g*, attached by means of a pivot to the damper-spindle, and provided with the weight *f* and buttoned pin H, whereby said damper is rigidly held in place when put in the desired position.

E. OTTO POHL.

Witnesses:
JNO. E. POHL,
JOHN WELSH.